United States Patent
Ben-Shalom

Patent Number: 6,095,189
Date of Patent: Aug. 1, 2000

[54] MAGNETIC VALVE

[75] Inventor: Zvi Ben-Shalom, Ariel, Israel

[73] Assignee: Q-Core Ltd., Ariel, Israel

[21] Appl. No.: 09/125,438

[22] PCT Filed: Sep. 1, 1997

[86] PCT No.: PCT/IL97/00290

§ 371 Date: Aug. 18, 1998

§ 102(e) Date: Aug. 18, 1998

[87] PCT Pub. No.: WO98/53234

PCT Pub. Date: Nov. 26, 1998

[30] Foreign Application Priority Data

May 19, 1997 [IL] Israel .......................... 120859

[51] Int. Cl.[7] .................................................. F61K 31/06
[52] U.S. Cl. .................... 137/606; 137/883; 251/129.09; 251/129.14
[58] Field of Search .................... 137/606, 883, 137/129.01, 129.09, 129.11, 129.14

[56] References Cited

U.S. PATENT DOCUMENTS

| | | |
|---|---|---|
| 2,056,322 | 10/1936 | Hoppe . |
| 3,443,585 | 5/1969 | Reinicke . |
| 4,320,781 | 3/1982 | Bouvet et al. . |
| 4,489,863 | 12/1984 | Horchos et al. . |
| 5,509,439 | 4/1996 | Tantardini . |
| 5,527,295 | 6/1996 | Wing . |
| 5,575,309 | 11/1996 | Connell . |

*Primary Examiner*—John Rivell
*Attorney, Agent, or Firm*—Renner, Otto, Boisselle & Sklar, LLP

[57] ABSTRACT

A fluid flow control valve which includes a fluid flow conduit with one or more fluid inlets and one or more fluid outlets, and with one or more discrete magnetic elements located within the conduit that are positioned by means of a number of selectably activated electromagnets located in association with the conduit. The magnetic element or elements can preferably be positioned either to close fluid flow by engaging a predetermined fluid inlet or outlet thereby to block fluid flow therethrough or to open fluid flow by not blocking fluid flow therethrough.

6 Claims, 5 Drawing Sheets

MAGNETIC VALVE

FIELD OF THE INVENTION

The present invention relates to magnetically activated valves for control of fluid flow.

BACKGROUND OF THE INVENTION

In any fluid flow control valve, control of fluid flow through the valve is achieved by moving a valve sealing element between open and closed positions. Mechanically activated valves have a full range of flow control capability from simple on-off or shutoff valves to precision flow control. Mechanically activated valves, however, have a number of points of contact between moving parts, resulting in friction that causes wear and eventual breakdown. Greater flow control is generally achieved only at the cost of a more complicated mechanical interface with more points of friction and wear.

Various types of magnetically activated valves are known (See, for example, U.S. Pat. No. 5,509,439), including mechanical valves adapted for operation by means of a magnetic driver, and other types, such as solenoid valves wherein the solenoid core shaft is also the valve sealing element (See, for example, U.S. Pat. No. 5,575,309). These valves have a problem of mechanical bearing of a core shaft, with resultant friction and wear. Such valves generally only work as shutoff valves, with no possibility of more precise fluid flow control.

U.S. Pat. No. 5,527,295 discloses a gravitational, magnetic, floating ball valve for use in the medical field as a protective fluid cut-off valve for infusion devices. The valve includes a hollow ball containing a magnet, which is arranged inside a vertical tube disposed in registration with an outlet. A second magnet is also disposed in vertical registration with the magnet. The magnet-containing valve is magnetically attracted towards the second magnet as the level of liquid in the infusion device decreases, sealing the outlet once the level of liquid in the infusion device drops to a predefined level.

SUMMARY OF THE INVENTION

The present invention seeks to provide a fluid flow control valve in which fluid flow control is achieved by magnetically controlling the position of one or a number of magnetic elements located within a fluid flow conduit. The present invention is further capable of positioning the one or more magnetic elements so as to regulate fluid flow without bearings or contact between moving parts, which allows the valve to function without the friction and wear found in prior art valves. The present invention can further serve as a shutoff valve to selectably permit or to precisely regulate fluid flow. As the only moving parts are the magnetic elements located within the conduit, the present invention is very simple and highly reliable.

There is thus provided, in accordance with a preferred embodiment of the invention, a fluid flow control valve which includes a fluid flow conduit with one or more fluid inlets and one or more fluid outlets, and with one or more discrete magnetic elements located within the conduit that are positioned by means of a number of selectably activated electromagnets located in association with the conduit. The magnetic element or elements can preferably be positioned either to close fluid flow by engaging a predetermined fluid inlet or outlet thereby to block fluid flow therethrough or to open fluid flow by not blocking fluid flow therethrough.

In accordance with additional embodiments of the present invention, the magnetic element or elements can further be selectably positioned in an intermediate position between the above-mentioned open and closed positions thereby selectably to partially block fluid flow in the conduit thereby to provide precise control of the fluid flow therethrough.

Further, in accordance with a preferred embodiment of the present invention, the magnetic element or elements comprise a core of magnetic material covered with a material operative to engage a fluid inlet or outlet thereby to form a fluid-tight seal.

In accordance with additional embodiments of the present invention, a plurality of magnetic elements are located within a fluid flow conduit and are prevented from being driven downstream in the conduit by fluid flow therein by screen elements positioned at fluid outlets. In alternative embodiments of the present invention, the arrangement and size of the screen element holes provide a capability of engaging individual magnetic elements to totally block fluid flow when the magnetic elements are in the closed position.

BRIEF DESCRIPTION OF THE DRAWINGS

The present invention will be more fully understood and appreciated from the following detailed description, taken in conjunction with the drawings, in which.

DETAILED DESCRIPTION OF THE INVENTION

Figure 1A:
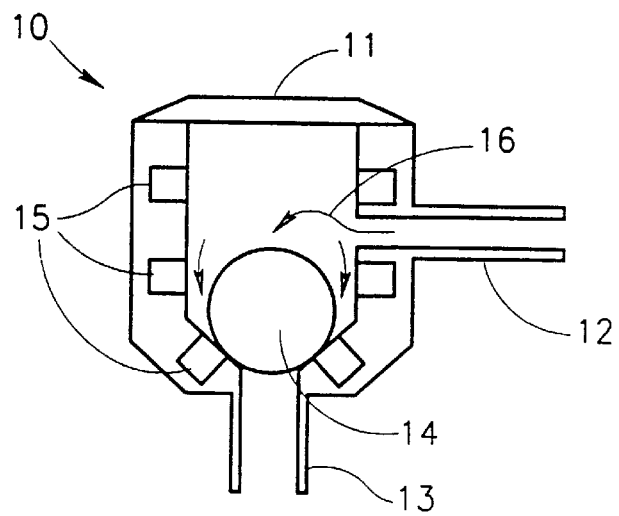
FIG. 1A is a schematic illustration of a magnetically activated fluid flow control device, constructed in accordance with a preferred embodiment of the present invention, in which a single flow regulating magnetic element is in a closed position to block fluid flow.
Figure 1B:
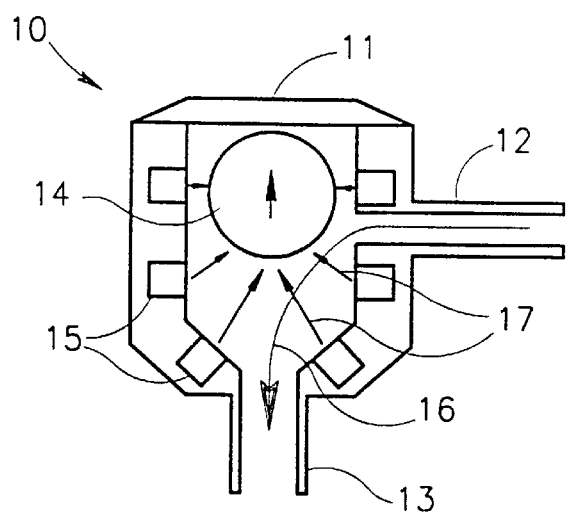
FIG. 1B shows the device of FIG. 1A with the magnetic element in an open position.
Figure 1C:
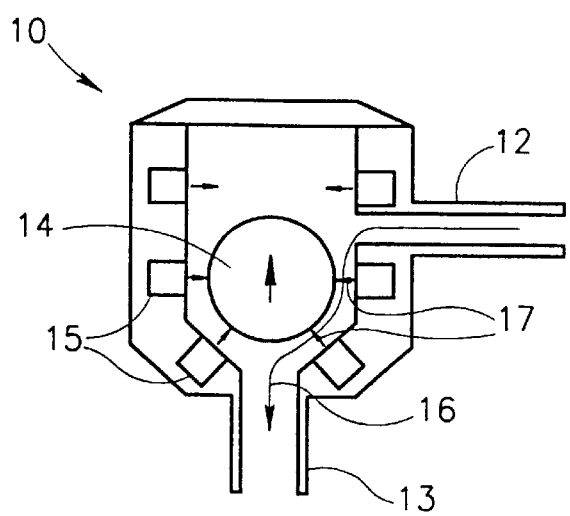
FIG. 1C shows the device of FIG. 1A with the magnetic element in an intermediate position.

Referring now to FIGS. 1A, 1B, and 1C, there is shown, schematically, a fluid flow control valve, referred to generally as 10, constructed in accordance with a preferred embodiment of the present invention. A fluid flow conduit 11 having a fluid inlet 12 and a fluid outlet 13 has a ball-shaped magnet element 14 totally contained within the conduit and which can be selectably positioned within the conduit by selectively activating electromagnets 15, mounted in association with the conduit 11, typically as shown in FIG. 1A. As shown in FIG. 1A, the ball-shaped magnetic element 14 can be positioned in engagement with the fluid outlet 13 of the conduit, thereby blocking fluid flow 16 therethrough. As shown in FIG. 1B, the ball-shaped magnetic element 14 can alternatively be positioned with respect to the fluid outlet 13 of the conduit so as to leave fluid flow 16 therethrough substantially unhindered. So configured, such an embodiment of the present invention serves as a shutoff valve for fluid flow. In accordance with a further preferred embodiment of the invention, the ball-shaped magnetic element 14 can be positioned within the conduit 11 so as to partially restrict or to regulate fluid flow 16 therethrough, as shown in FIG. 1C. With suitable positioning of the electromagnets 15 and with fine control of the magnetic fields 17 they generate, fine control of the rate of fluid flow 16 through the conduit 11 can be achieved.

Figure 2A:
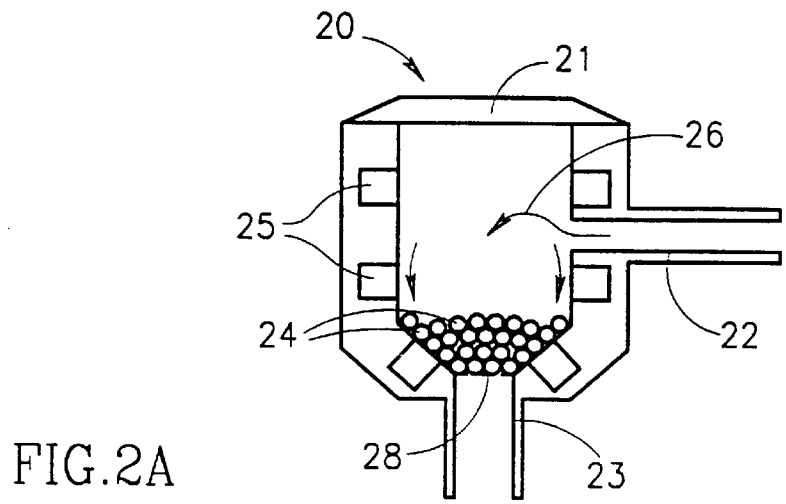
FIG. 2A is a schematic illustration of a magnetically activated fluid flow control device, constructed in accordance with an alternative embodiment of the present invention, employing a plurality of magnetic elements which are in a closed position to maximally restrict or to block fluid flow.
Figure 2B:
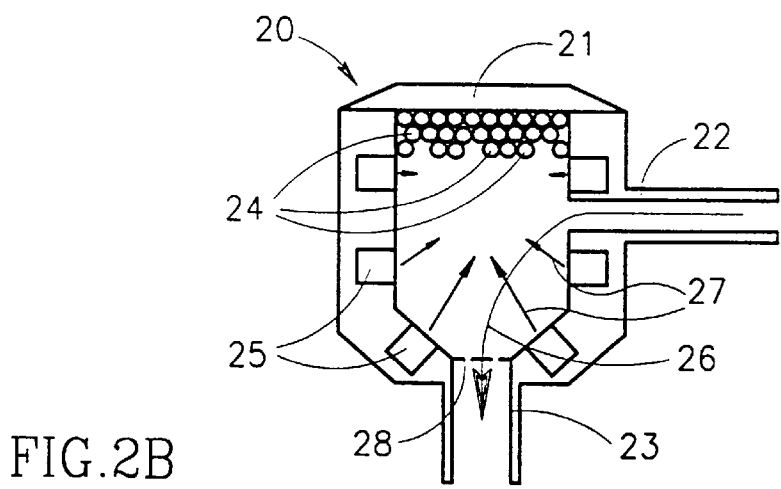
FIG. 2B shows the device of FIG. 2A with the magnetic elements in an open position to allow maximum fluid flow.
Figure 2C:
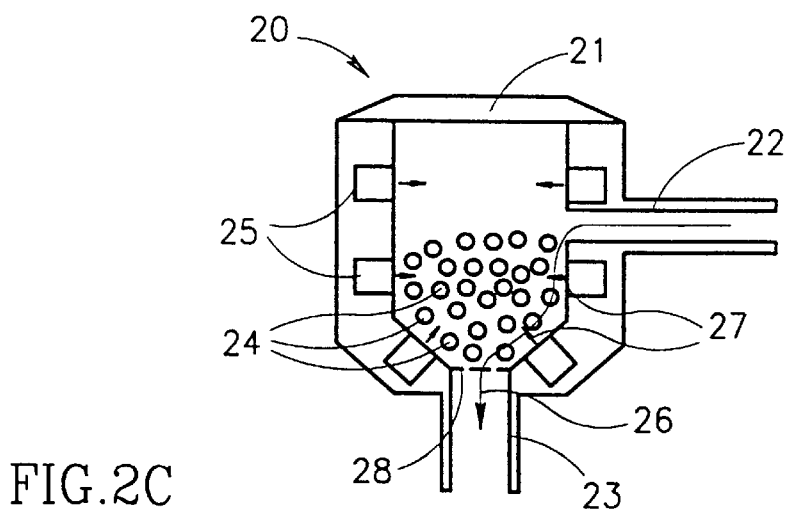
FIG. 2C shows the device of FIG. 2A with the magnetic elements in intermediate positions to partially restrict fluid flow.

Referring now to FIGS. 2A, 2B, and 2C, there is shown, schematically, a fluid flow control valve, referred to generally as 20, constructed in accordance with a alternative embodiment of the present invention. A fluid flow conduit 21 having one fluid inlet 22 and one fluid outlet 23 has a plurality of discrete magnet elements 24 totally contained within the conduit and a screen element 28 located over the fluid outlet 23. The screen element 28 prevents magnetic elements 24 from leaving the conduit 21 with the fluid flow 26. The magnetic elements can be selectably positioned within the conduit by selectively activating electromagnets 25, mounted in association with the conduit 21, typically as shown in FIG. 2A. As shown in FIG. 2A, the magnetic elements 24 can be positioned in engagement with the screen element 28 of the fluid outlet 23 of the conduit 21, thereby blocking or nearly blocking, depending on the distribution and size of openings for fluid flow in the screen 28, fluid flow 26 therethrough. As shown in FIG. 2B, the magnetic elements 24 can be positioned with respect to the fluid outlet 23 of the conduit 21 so as to leave fluid flow 26 therethrough totally unhindered. So configured, such an embodiment of the current invention serves as a shutoff valve for fluid flow. In accordance with a further embodiment of the invention, the magnetic elements 24 can be positioned within the conduit 21 so as to partially restrict fluid flow 26 therethrough, as shown in FIG. 2C. With suitable positioning of the electromagnets 25 and with fine control of the magnetic fields 27 they generate, fine control or regulation of the rate of fluid flow 26 through the conduit 21 can be achieved.

Figure 3:
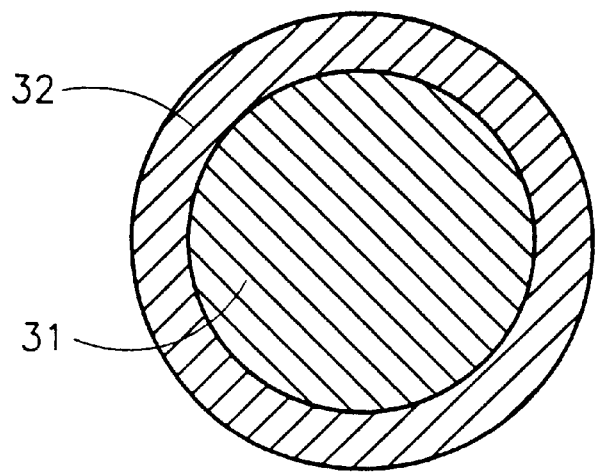
FIG. 3 shows a typical cross-section of a magnetic element of an alternative embodiment of the present invention.

The magnetic elements 14 and 24 in FIGS. 1 and 2 respectively may be fabricated entirely of magnetic material or, in alternative embodiments of the present invention, they can be comprised of a core of magnetic material 31, which can optionally be a permanent magnet, with an outer coating 32, as shown in FIG. 3. The outer coating is preferably of a material operative to engage either a predetermined fluid inlet or outlet or any of the openings for fluid flow in screen element 28 so as to provide a fluid-tight seal with that predetermined fluid inlet or outlet or opening in screen element 28.

Figure 4:
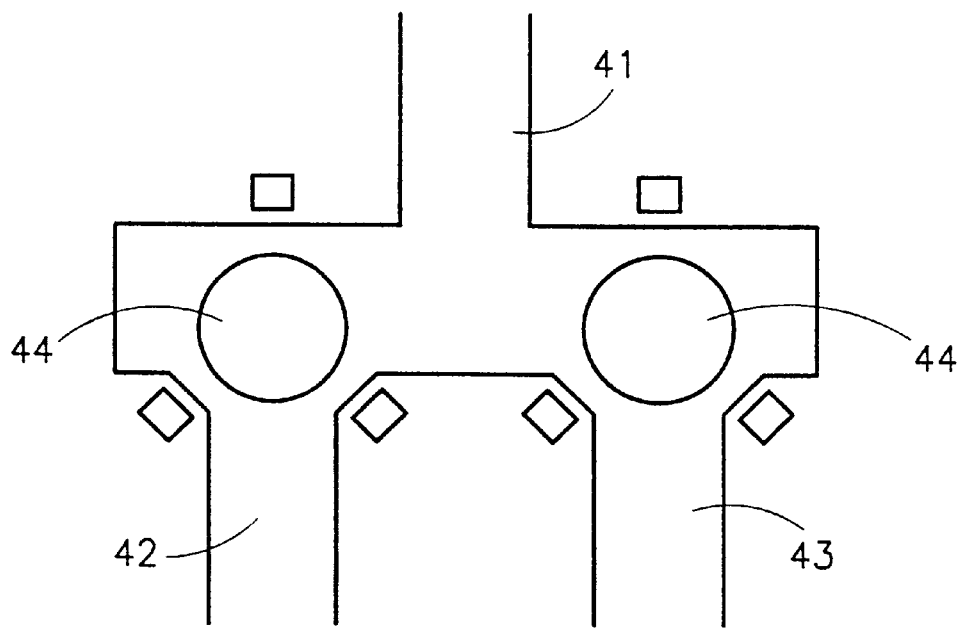
FIG. 4 shows yet a further alternative embodiment of the present invention having one fluid inlet, two fluid outlets, and two magnetic elements.
Figure 5:
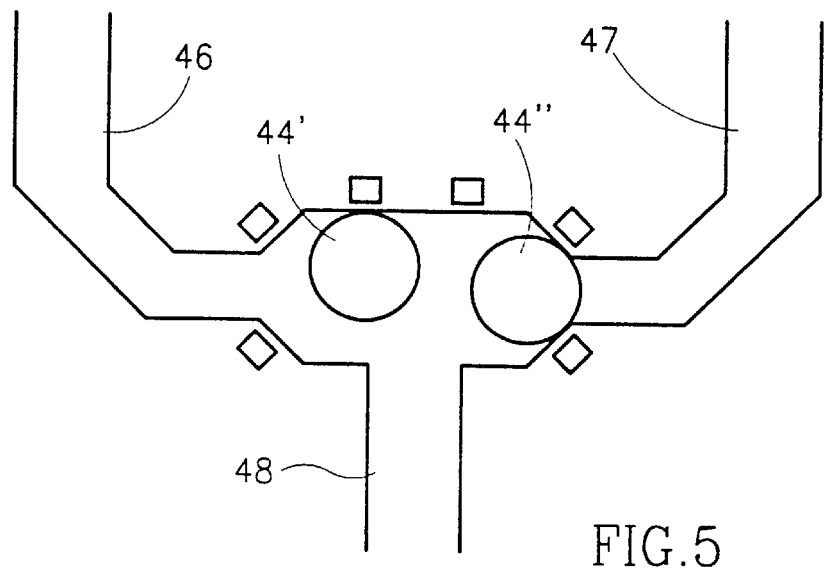
FIG. 5 shows yet a further alternative embodiment of the present invention having two fluid inlets, two magnetic elements, and one fluid outlet.

As will be understood by persons skilled in the art, fluid flow control valves are used to mix or select fluids coming from a number of inlets and route their flow via selected outlets. Referring now to FIGS. 4 and 5, there are shown, in alternative embodiments of the present invention, a fluid flow control valve having one fluid inlet 41, two fluid outlets 42 and 43, and two magnetic elements 44 and a fluid flow control valve having two fluid inlets 46 and 47, two magnetic elements 44' and 44" respectively, and one fluid outlet 48. It will be further appreciated by persons skilled in the art, that the configurations of fluid inlets and outlets in FIGS. 4 and 5 are shown merely by way of example, and that the scope of the present invention is not by limited thereby. In FIG. 4, by selective positioning of magnetic elements 44, fluid flow from the fluid inlet 41 is selectably stopped or routed via a specific fluid outlet, 42 or 43, or the combination thereof. In FIG. 5, by selective positioning of magnetic elements 44' and 44", fluid flow is selected from a desired fluid inlet 46 or 47, respectively, or the combination thereof, and is routed via fluid outlet 48. In the example shown in FIG. 5, the right magnetic element 44" is positioned to stop fluid flow from the right fluid inlet 47, and the left magnetic element 44' is positioned to permit fluid flow from the left fluid inlet 46.

Figure 6:
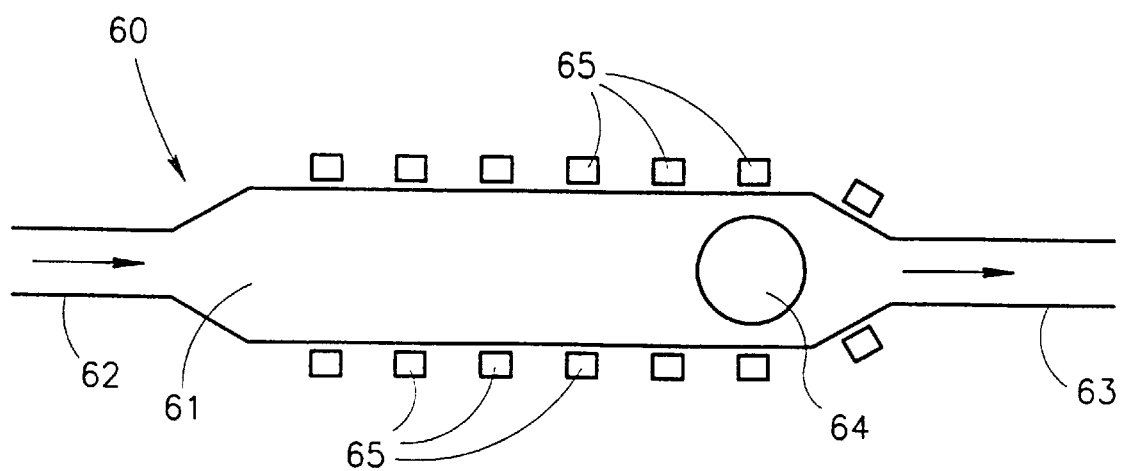
FIG. 6 shows yet a further alternative embodiment of the present invention having one fluid inlet, one fluid outlet, and one magnetic element with a range of possible intermediate positions.

Referring now to FIG. 6, there is shown, schematically, a fluid flow control valve, referred to generally as 60, constructed in accordance with an alternative embodiment of the present invention. A fluid flow conduit 61 having a fluid inlet 62 and a fluid outlet 63 has a single ball-shaped magnet element 64 totally contained within the conduit and a plurality of electromagnets 65, mounted in association with the conduit 61. By selectively activating the electromagnets 65, the magnetic element 64 can be positioned selectably within the conduit 61 so as to provide high resolution control of the fluid flow therethrough.

Figure 7A:
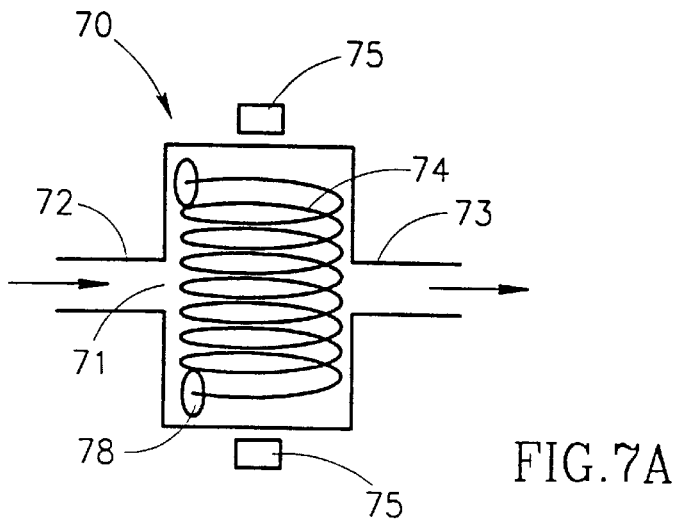
FIG. 7A shows yet a further alternative embodiment of the present invention having a magnetic element that is a narrow spring.
Figure 7B:
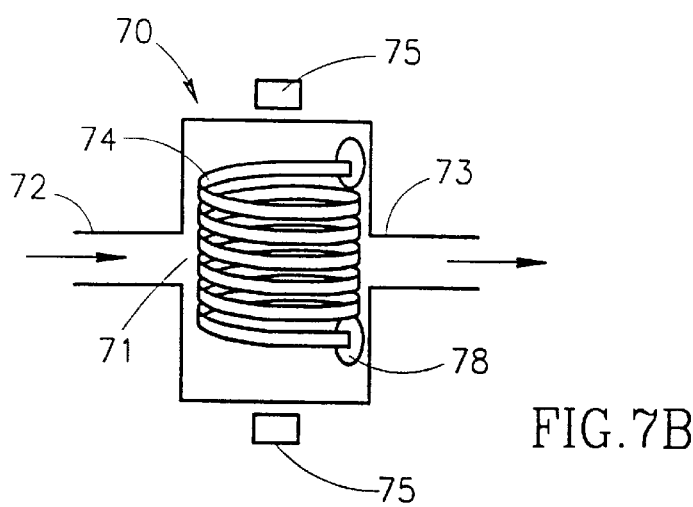
FIG. 7B shows yet a further alternative embodiment of the present invention having a magnetic element that is a wide spring.

In accordance with further embodiments of the invention, there are shown, in FIGS. 7A and 7B, fluid flow control valves 70 wherein the magnetic element 74 in the conduit 71 is spring-shaped, optionally fitted with disk-shaped elements 78 on each end, as shown in the figures. The spring-shaped magnetic elements 74 may be narrow, as shown in FIG. 7A, or wide, as shown in FIG. 7B, to provide an additional measure of control over the fluid flow through the conduit 71. The wide magnetic element 74 in FIG. 7B can further be positioned so as to block fluid flow completely. The optional disks 78 can block the fluid flow completely by engaging the fluid inlet 72 or outlet 73.

Figure 8:
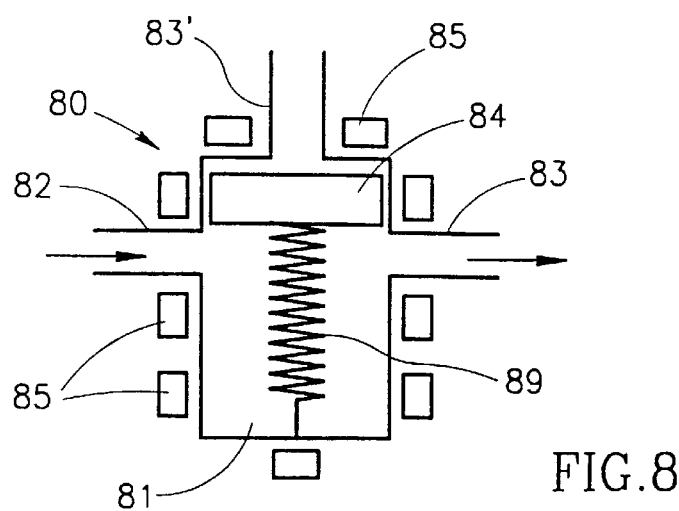
FIG. 8 shows yet a further alternative embodiment of the present invention having a disk-shaped or cylindrical magnetic element that is mounted on a spring.

Referring now to FIG. 8, there is shown, schematically, a fluid flow control valve, referred to generally as 80, constructed in accordance with a further alternative embodiment of the present invention. In the present embodiment, a cylindrical disk-shaped magnetic element 84 is mounted on a spring 89 which serves to provide a positioning force for the element 84 in addition to that provided by electromagnets 85. As shown in the figure, the cylindrical disk-shaped element 84 can be positioned to block fluid flow from a selected inlet 83' to the conduit 81 or partially block, thereby to control, the flow through a second inlet 82 and outlet 83 to the conduit 81. In a variation of the present embodiment, not shown, the cylindrical disk-shaped magnetic element 84 is replaced by a number of cylindrical disk-shaped magnetic elements mounted and positioned so as to selectably block fluid flow from a selected number of inlets or outlets.

It will be appreciated, by persons skilled in the art that the scope of the present invention is not limited by what has been specifically shown and described hereinabove, merely by way of example. Rather, the scope of the present invention is defined solely by the claims, which follow.

What is claimed is:

1. A device for regulating fluid flow which includes:

a conduit having at least one fluid inlet and at least one fluid outlet, and containing a throughflow of fluid;

a plurality of discrete magnetic elements located within said conduit;

magnetic apparatus for selectably positioning said plurality of magnetic elements with respect to said conduit, so as to provide regulation of the throughflow; and at least one screen member in association with said at least one outlet for retaining said plurality of magnetic elements upstream of said outlet.

2. A device according to claim 1 wherein said magnetic apparatus is operative to selectably position said plurality of magnetic elements in at least a closed and an open position, wherein;

in said closed position, said plurality of magnetic elements is located in engagement with a predetermined one of said fluid inlet and said fluid outlet thereby to block fluid flow therethrough, and in said open position, said plurality of magnetic elements is not located in engagement with either of said fluid inlet or said fluid outlet so as not to block fluid flow therethrough.

3. A device according to claim 2 wherein said magnetic apparatus is further operative to selectably position said plurality of magnetic elements in an intermediate position between said closed and open positions thereby to permit a selected fluid flow through said conduit.

4. A device according to claim 2 wherein said conduit has at least one of at least two fluid inlets and a least two fluid outlets and wherein said plurality of magnetic elements are positioned in a selected combination of said open and closed positions so as to route the fluid flow through at least one of a selected fluid inlet and a selected fluid outlet of said conduit.

5. A device according to claim 3 wherein said magnetic apparatus includes a plurality of selectably actuable electromagnets distributed about said conduit so as to selectably exert magnetic forces on said plurality of magnetic elements so as to cause positioning thereof in a selected position within said conduit.

6. A device according to claim 2 wherein each said magnetic element includes:

a core of magnetic material; and an outer covering of material which is operative, when said at least one magnetic element is in said closed position, to engage one of said fluid inlet and said fluid outlet so as to form therewith a fluid-tight seal.

* * * * *